Aug. 18, 1925.
E. M. HARBERSON
SLIP SLEEVE VALVE
Filed May 14, 1924
1,549,975
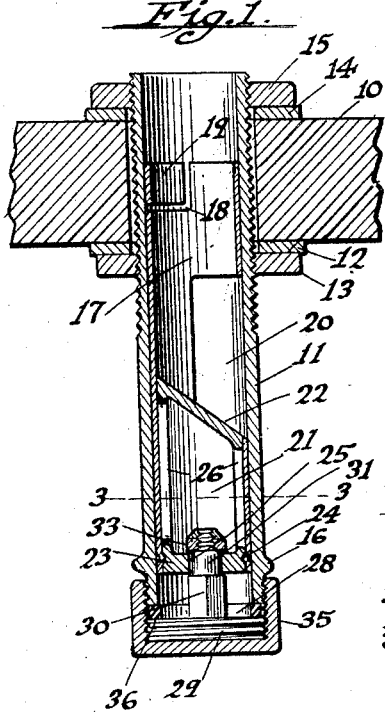
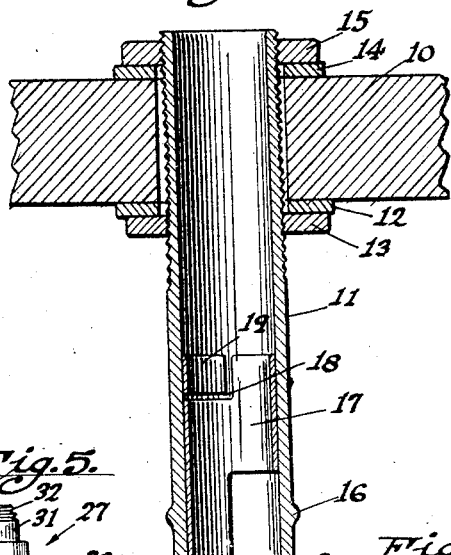
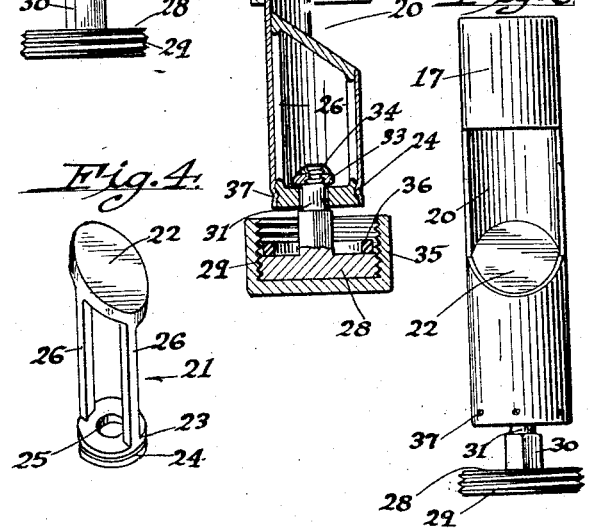
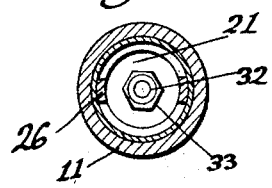
Inventor:
E. M. Harberson
By Hazard and Miller
Attorneys
Witness:

Patented Aug. 18, 1925.

1,549,975

UNITED STATES PATENT OFFICE.

EDWARD M. HARBERSON, OF LOS ANGELES, CALIFORNIA.

SLIP-SLEEVE VALVE.

Application filed May 14, 1924. Serial No. 713,205.

*To all whom it may concern:*

Be it known that I, EDWARD M. HARBERSON, a citizen of the United States, residing at Los Angeles, in the county of Los Angeles and State of California, have invented new and useful Improvements in Slip-Sleeve Valves, of which the following is a specification.

This invention relates to slip sleeve valves and has one utility in replacing the usual cap at the end of a drain pipe, or the like, whereby the outflow of a drained liquid may be directed in a predetermined direction.

Another object of my invention is the provision of a slip sleeve valve having certain improvements on the device described and claimed in my Patent No. 1,512,333, issued October 21, 1924, entitled Slip sleeve valve.

With the foregoing objects in view, together with such other objects and advantages as may subsequently appear, this invention consists in the construction and arrangement of parts hereinafter described and claimed and illustrated in the accompanying drawings, in which:

Figure 1 is a vertical section through a valve of my invention, showing the same closed, Fig. 2 is a view similar to Fig. 1, but showing the valve open, Fig. 3 is a transverse section taken on the line 3—3 of Fig. 1, Fig. 4 is a perspective view of a plug employed in my valve, Fig. 5 is an elevational view of a link employed to connect a cap to the plug shown in Fig. 4, and Fig. 6 is an elevational view of a sleeve in which is inserted the plug shown in Fig. 4, the link shown in Fig. 5 being secured to the plug.

Referring to the drawings for a more detailed description thereof, the numeral 10 indicates a portion of the bottom of a tank, and the numeral 11 indicates a cylindrical outlet pipe which passes through an aperture in the bottom of the tank. The pipe 11 is externally threaded at its upper portion. A washer 12 encircles the pipe 11 and abuts against the lower face of the tank bottom 10 and is held tightly thereto by a nut 13, which threadedly engages the pipe 11. A washer 14 encircles the pipe 11 and is held tightly against the upper surface of the tank bottom 10 by a nut 15 which threadedly engages the pipe 11. Formed on the lower end portion of the pipe 11 is a peripheral shoulder 16, below which the pipe 11 is provided with external threads.

A cylindrical sleeve 17 is snugly, but slidably, fitted into the pipe 11. The upper end portion of the sleeve 17 is provided with an L-slot 18, forming thereby a free portion 19 which may be bent slightly outward to give a tighter fit of the sleeve to the pipe 11. The sleeve 17 is cut away to provide a lateral aperture 20, the lower edge of the cut portion being inclined downwardly in an outward direction.

A plug 21, shown in Fig. 4, is fitted into the sleeve 17 and secured thereto in any suitable manner, as, for example, by brazing. The plug 21 comprises a solid upper end 22 inclined with respect to the lower end 23 which is provided with a peripheral groove 24 and with a central vertical circular aperture 25. The top 22 and the bottom 23 of the plug are preferably cast integral with spacing members 26, which are spaced from one another.

Before inserting the plug 21 into the sleeve 17, a link 27, shown in Fig. 5, is secured to the bottom 23 of the plug. The link 27 comprises a circular plate 28 provided with external threads 29. Integral with the plate 28 and normal to its upper surface is a polygonal extension 30 and integral with, and extending beyond which is a reduced cylindrical portion 31 provided with threads 32 at its uper end portion.

In assembling the plug 21 with the link 27, the portion 31 of the link is inserted into the aperture 25 of the plug. The diameter of the aperture 25 is larger than the diameter of the cylindrical portion 31 so that the connection between the link and the plug is loose. The upper surface of the polygonal extension 30 forms a shoulder which abuts against the lower face of the bottom 23 of the plug 21, and the upper or threaded portion of the cylindrical portion 31 extends above the upper surface of the bottom 23 of the plug. A nut 33 is inserted between the members 26 and is screwed on to the threads 32 after inserting the portion 31 through the aperture 25 and is subsequently secured against removal by a mass of solder or brazing material 34. The plate 28 threadedly engages a cap 35 which is provided with internal threads for engaging the plate 28 and also for engaging external threads formed on the periphery of the pipe 11 below the shoulder 16. A washer 36 is provided within the cap 35 for the purpose of making a tight joint with the lower end of the pipe 11. The plug 21 is preferably inserted into the sleeve 17 until the lower portion of the upper face of the upper end 22 of the plug is flush with the inclined edge adjacent the lower end of the aperture 20.

After the insertion of the plug 21 into the sleeve 17, the latter is punched in at a plurality of points opposite the peripheral groove 24, forming thereby projections 37 which aid in securing the plug 21 to the sleeve 17.

It will be understood that the sleeve 17 is vertically slidable in the pipe 11 with a slight pull or push on the former, but is adapted to turn in the pipe only when a considerable pressure is applied. It is desirable that the sleeve 17 should not turn in the pipe 11 when the cap 35 is screwed on or from the pipe 11, so that it may always be known from some marking placed upon the pipe 11 or the cap 35, the direction in which the contents of the tank will be discharged when the cap is unscrewed and the sleeve pulled down into the position shown in Fig. 2. In order not to rotate the sleeve when the cap is screwed or unscrewed, the loose swivel connection described has been provided.

It will thus be seen that I have provided a device capable of controlling the flow of a drained liquid and one which may be operated without soiling the hands and which operates without scattering the drained material.

Moreover, the device of my invention may be manipulated so that access may be readily had to a pipe to clean out solid matter, such as paper, for example, which clogs a pipe.

This invention has been described, but modifications thereof may be devised without departing from the spirit thereof, and it is to be understood that such modifications come within the scope of this invention.

What is claimed is:

1. In a slip sleeve valve, a sleeve having a lateral aperture, a plug inserted in and secured to said sleeve, said plug having an inclined upper end adjacent said aperture, and a cap secured to said plug by a swivel connection, said cap being adapted to close a pipe into which said sleeve is adapted to be fitted.

2. In a slip sleeve valve, a sleeve having a lateral aperture, a plug inserted in and secured to said sleeve, said plug having an inclined upper end adjacent said aperture, a link secured to said plug by a swivel connection, and a cap secured to said link, said cap being adapted to close the lower end of a pipe into which said sleeve is adapted to be fitted.

3. In a slip sleeve valve, a sleeve having a lateral aperture, a plug inserted in and secured to said sleeve, said plug having an upper end adjacent said aperture, and a cap secured to said plug by a swivel connection, said cap being adapted to close the end of a pipe into which said sleeve is adapted to be fitted.

4. In a slip sleeve valve, a sleeve having a lateral aperture, a plug inserted in and secured to said sleeve, a link secured to said plug by a loose swivel connection, and a cap secured to said link, said cap being adapted to close a pipe into which said sleeve is adapted to be fitted.

5. In a slip sleeve valve, a sleeve having a lateral aperture, a plug inserted in and secured to said sleeve, a link secured to said plug by a loose swivel connection, a cap secured to said link said cap being adapted to close a pipe into which said sleeve is adapted to be fitted, and a gasket in said cap.

6. In a slip sleeve valve, an apertured sleeve having a closed end and a cap connected to said sleeve by a swivel connection, said cap being adapted to close a pipe into which said sleeve is adapted to be fitted.

7. In a slip sleeve valve, an apertured sleeve having a closed end and a cap loosely secured to said sleeve, said cap being adapted to close a pipe into which said sleeve is adapted to be fitted.

8. In a slip sleeve valve, a sleeve having a lateral aperture, a hollow plug inserted in and secured to said sleeve, said plug having an inclined upper end adjacent said aperture, a link loosely secured to the lower end of said plug, and a cap secured to said link, said cap being adapted to close a pipe into which said sleeve is adapted to be fitted.

9. In a slip sleeve valve, a pipe, a sleeve slidable in said pipe, said sleeve having a lateral opening, a plug closing the bottom of said sleeve, said plug having an upper plate and a lower plate held in spaced relation to each other by spacing members.

10. In a slip sleeve valve, a pipe, a sleeve slidable in said pipe, said sleeve having a lateral opening, and a plug closing the bottom of said sleeve, said plug having an upper plate and a lower plate held in spaced relation to each other by spacing members, said upper plate being inclined downwardly toward the bottom of said opening.

11. In a slip sleeve valve, a pipe, a sleeve slidable in said pipe, said sleeve having a lateral opening, a plug closing the bottom of said sleeve, said plug having an upper plate and a lower plate held in spaced relation to each other by spacing members, an aperture formed in said lower plate, a link loosely fitting within said aperture, an enlargement secured upon said link upon the upper side of said plate, and a cap connected to said link.

12. In a slip sleeve valve, a pipe, a sleeve slidable in said pipe, said sleeve having a lateral opening, a plug closing the bottom of said sleeve, said plug having an upper plate and a lower plate held in spaced relation to each other by spacing members, an aperture formed in said lower plate, a link loosely fitting within said aperture, an enlargement secured upon said link upon the upper side of said plate, and a cap connected to said link, said cap being adapted to close the end of said pipe.

13. In a slip sleeve valve, a pipe, a sleeve slidable in said pipe, said sleeve having a lateral opening, a plug closing the bottom of said sleeve, said plug having an upper plate and a lower plate held in spaced relation to each other by spacing members, an aperture formed in said lower plate, a link loosely fitting within said aperture, an enlargement secured upon said link upon the upper side of said lower plate, a plate integral with said link, and an internally threaded cap screwed on to the last mentioned plate, said cap being adapted to screw on to said pipe.

14. In a slip sleeve valve, a pipe, a sleeve slidable in said pipe, said sleeve having a lateral opening, a plug closing the bottom of said sleeve, said plug having an upper plate and a lower plate held in spaced relation to each other by spacing members, an aperture formed in said lower plate, a link loosely fitting within said aperture, an enlargement secured upon said link upon the upper side of said lower plate, a plate integral with said link, an internally threaded cap screwed on to the last mentioned plate, said cap being adapted to screw on to said pipe, and a gasket mounted upon the last mentioned plate.

In testimony whereof I have signed my name to this specification.

EDWARD M. HARBERSON.